Patented Sept. 6, 1938

2,129,459

UNITED STATES PATENT OFFICE 2,129,459

LEAK-SEALING AND RUST PREVENTING COMPOSITION

Constant A. Benoit, Brooklyn, N. Y., assignor to Permatex Company, Inc., Brooklyn, N. Y., a corporation of New York No Drawing. Application April 10, 1935, Serial No. 15,576

9 Claims. (Cl. 134—17.5)

The object of my invention is a leak-sealing and rust-preventing composition and refers particularly to a composition adapted for the sealing of leaks in water containers and the prevention of rust formation, if such containers be made of iron or steel.

In water circulating systems, and especially in automobile radiators and engine water-jackets which are subjected to shocks, distortions and heat during use, leaks are liable to occur at the points of mechanical connections or in the metals themselves due to pitting caused by rust.

Frequently these leaks, cracks, or holes, are of such minor size that they can be closed by the introduction of proper ingredients into the water.

Ingredients adapted for this purpose must be capable of diffusion throughout the water, must not have an injurious effect upon the metals and circulating apparatus employed and must have the property of becoming solidified within the openings while remaining unaffected by the circulating hot or cold water when thus deposited.

My composition of matter produces all of the above mentioned desirable results and in addition possesses the valuable attributes of preventing the formation of rust, which latter has a tendency to clog the system, and destroy the metal parts. My composition of matter produces a more tenacious contact between the metal sides of the openings, thus preventing the dislodgement of the sealing deposit under working conditions, and of preventing the deposition of the calcium and magnesium salts usually present in the ordinary water supply.

I have found that if water-soluble chrome salts and a glutinous material be added to a water circulating system, new and unexpected results of the greatest value are obtained.

Experiments have shown that a mixture of a glutinous or gelatinized material and a water-soluble chromate when added to a water circulating system, rusting of the metal parts is inhibited, the calcium and magnesium salts are retained in solution and a superior sealing composition is deposited within the leaking parts.

The properties of the chrome salts render them particularly suitable for use as an element in a leak-sealing composition.

The solubilities of the alkali-metal chromates and bichromates are such as to allow of a solution of sufficient strength to act as a rust inhibitor, and the formation of magnesium and calcium chrome compounds, if any calcium and magnesium water-hardening compounds are present, and these magnesium and calcium chrome compounds are sufficiently soluble to remain in solution.

In addition to the valuable solubility properties of the chrome compounds, they possess the unexpected attribute of being readily deposited with the glutinous or gelatinized material within the leaks, and, and under the influence of the heated metal they crystallize and in combination with the glutinous or gelatinized material form a hard and strongly adherent seal.

This unexpected property of the chrome salts in the presence of glutinous or gelatinized materials is of the greatest value as there is thus formed a sealing material of much greater strength than that possessed by the glutinous or gelatinized material alone or, than that possessed by a mixture of a glutinous or gelatinized material and those metallic salts previously suggested and which do not crystallize within the glutinous or gelatinized material within the leaking opening.

It is evident, therefore, that by the employment of my composition rust is prevented, the precipitation of the water-hardening compounds is prevented and leaks are sealed during the operation of the water circulating system without discontinuing the use of the machine or equipment.

Among the chrome salts I have found suitable for use in my sealing composition are potassium chromate, sodium chromate, ammonium chromate, potassium bichromate, sodium bichromate and ammonium bichromate, but I prefer to employ potassium bichromate, without, however, limiting myself to this particular chrome salt.

By "glutinous or gelatinized materials" I mean those materials and products which form glutinous, gelatinous or colloidal aqueous solutions of chrome salts, among which are ground flaxseed meal, ground quince seeds, Irish moss, ground psyllium seeds, locust bean gum, colloidal clay and gluten, but I prefer to employ ground flaxseed meal without, however, limiting myself to this particular glutinous material.

Without limiting myself to the particular compounds or quantities mentioned I give the following examples of the formation of the composition of my invention.

Example 1

¾ to 1¾ ounces of finely pulverized potassium bichromate is thoroughly mixed with 1¼ ounces of finely ground processed flaxseed meal.

I suggest the use of from two to three ounces of the above mixture for the average size automobile radiator, the quantity naturally varying with the quantity of circulating water.

As the above mixture is added to the circulating hot water, the potassium bichromate immediately dissolves and in so doing it diffuses the particles of flaxseed meal thereby preventing the formation of lumps of flaxseed and producing a uniform treating product. The circulation of the water moves the particles of gelatinous flaxseed to the leak, thereby closing it. The water in the gelatinized flaxseed meal seal also contains the potassium bichromate in solution. The heat of the metal adjacent to the leak causes the flaxseed to solidify and the bichromate to crystallize in the crevice, the combination of the two forming a hard and tenacious seal.

*Example 2*

The potassium bichromate of Example 1 is substituted by an equal quantity of sodium chromate.

*Example 3*

The flaxseed meal of Example 1 is replaced by an equal quantity of ground quince seeds.

*Example 4*

The flaxseed meal of Example 1 is replaced by an equal quantity of gluten.

It will thus be seen that in addition to its improved sealing properties my compositions have the attribute of being rust-inhibitors and preventatives of calcium and magnesium salt precipitatives.

I do not limit myself to the particular compounds, quantities or steps of procedure mentioned, as these are given simply to explain my invention.

What I claim is:

1. A dry composition of matter adapted to form hard and strongly coherent sealing means for liquid leaks in heated metallic conduits and for inhibiting rust formation consisting of a mixture of a glutinous or gelatinous-forming material and a water-soluble chrome salt.

2. A dry composition of matter adapted to form hard and strongly coherent sealing means for liquid leaks in heated metallic conduits and for inhibiting rust formation consisting of a mixture of a glutinous or gelatinous-forming material and an alkali-metal water-soluble chrome salt.

3. A dry composition of matter adapted to form hard and strongly coherent sealing means for liquid leaks in heated metallic conduits and for inhibiting rust formation consisting of a mixture of a glutinous or gelatinous-forming material and potassium bichromate.

4. A dry composition of matter adapted to form hard and strongly coherent sealing means for leaks in heated metallic conduits and for inhibiting rust formation consisting of a mixture of ground flaxseed meal and a water-soluble chrome salt.

5. A dry composition of matter adapted to form hard and strongly coherent sealing means for leaks in heated metallic conduits and for inhibiting rust formation consisting of a mixture of ground flaxseed meal and an alkali metal water-soluble chrome salt.

6. A dry composition of matter adapted to form hard and strongly coherent sealing means for leaks in heated metallic conduits and for inhibiting rust formation consisting of a mixture of ground flaxseed meal and potassium bichromate.

7. A dry composition of matter adapted to form hard and strongly coherent sealing means for liquid leaks in heated metallic conduits and for inhibiting rust formation, consisting of a mixture of approximately 1¼ ounces of a glutinous or gelatinous forming material and approximately 1¾ ounces of ground water-soluble chrome salt.

8. A dry composition of matter adapted to form hard and strongly coherent sealing means for liquid leaks in heated metallic conduits and for inhibiting rust formation, consisting of a mixture of approximately 1¼ ounces of ground flaxseed meal and approximately 1¾ ounces of ground water-soluble chrome salt.

9. A dry composition of matter adapted to form hard and strongly coherent sealing means for liquid leaks in heated metallic conduits and for inhibiting rust formation, consisting of a mixture of approximately 1¼ ounces of ground flaxseed meal and approximately 1¾ ounces of potassium bichromate.

CONSTANT A. BENOIT.